United States Patent
Ju et al.

(10) Patent No.: US 10,038,522 B1
(45) Date of Patent: Jul. 31, 2018

(54) MODULAR PIM ANALYZER AND METHOD USING THE SAME

(71) Applicant: INNERTRON, INC., Incheon (KR)

(72) Inventors: Jae Hyun Ju, Incheon (KR); Jun Ho Kang, Seoul (KR); Hak Rae Cho, Gyeonggi-do (KR); Moon Bong Ko, Incheon (KR)

(73) Assignee: INNERTRON, INC., Incheon (KR)

( * ) Notice: Subject to any disclaimer, the term of this patent is extended or adjusted under 35 U.S.C. 154(b) by 0 days.

(21) Appl. No.: 15/460,672

(22) Filed: Mar. 16, 2017

(30) Foreign Application Priority Data

Feb. 1, 2017 (KR) .................. 10-2017-0014531

(51) Int. Cl.
  *H04B 3/46* (2015.01)
  *H04L 1/20* (2006.01)
  *H04L 1/24* (2006.01)

(52) U.S. Cl.
  CPC .............. *H04L 1/206* (2013.01); *H04L 1/244* (2013.01); *H04L 1/247* (2013.01)

(58) Field of Classification Search
  CPC .......... H04L 1/206; H04L 1/244; H04L 1/247
  USPC ......................................... 375/226; 324/612
  See application file for complete search history.

(56) References Cited

U.S. PATENT DOCUMENTS

| | | | |
|---|---|---|---|
| 9,768,892 B1* | 9/2017 | Bradley | H04B 17/0085 |
| 2009/0096466 A1* | 4/2009 | Delforce | H04B 17/23 |
| | | | 324/612 |
| 2016/0277068 A1* | 9/2016 | Heinikoski | H04B 1/0475 |

FOREIGN PATENT DOCUMENTS

KR   10-1603611 B1   3/2016

* cited by examiner

*Primary Examiner* — Chieh M Fan
*Assistant Examiner* — Fitwi Hailegiorgis
(74) *Attorney, Agent, or Firm* — Stein IP, LLC

(57) ABSTRACT

A modular PIM analyzer includes: a first signal amplification module provided with a first signal generator for generating a first frequency signal under control of a first MCU, and a first power amplifier for generating a first amplified frequency signal through the amplification of the first frequency signal under control of a first ALC circuit; a second signal amplification module provided with a second signal generator for generating a second frequency signal under control of a second MCU, and a second power amplifier for generating a second amplified frequency signal through the amplification of the second frequency signal under control of a second ALC circuit; and a triplexer module for extracting a test frequency signal using the first amplified frequency signal and the second amplified frequency signal, transmitting the test frequency signal to a device under test, and receiving a PIM signal being reflected from the device under test.

10 Claims, 3 Drawing Sheets

MODULAR PIM ANALYZER AND METHOD USING THE SAME

CROSS-REFERENCE TO RELATED PATENT APPLICATION

This U.S. non-provisional patent application claims priority under 35 U.S.C. § 119 of Korean Patent Application No. 10-2017-0014531 filed on Feb. 1, 2017 in the Korean Intellectual Property Office, the entire contents of which are hereby incorporated by reference.

TECHNICAL FIELD

The present invention relates to a passive inter-modulation (PIM) analyzer and a method using the same, more particularly, relates to a modular passive intermodulation (PIM) analyzer and a method using the same.

BACKGROUND

Conventionally, there have been developed devices for measuring and analyzing passive intermodulation (hereinafter referred to as 'PIM') or passive intermodulation distortion (PIMD); however, it has been inconvenient to use other devices depending on the frequency band of the device under test.

In addition, when the device under test is operating over the multiple frequency bands, it has been inconvenient in that various devices must be used for the test. In addition, in the case of a device applied for the multiple frequency bands, there is a problem that volume and weight become large.

In addition, there has been a problem that a micro control unit (MCU) is required for each of a signal generator and a high power amplifier (HPA) for the control of the test frequency signal.

Further, there has been a problem that it is difficult to compensate for the loss when a loss occurs in the test frequency signal according to the frequency or the temperature.

Prior-Art Documents (Patent Document 1) Korea Registered Patent Publication No. 1603611 (Registration Date: Mar. 9, 2016)

SUMMARY

An objective of the present invention devised to solve the above mentioned problems is to provide a modular PIM analyzer and a method using the same that can be detached for replacement according to a frequency band of a device under test.

Another objective of the present invention is to provide a modular PIM analyzer and a method using the same capable of controlling a signal generator and a power amplifier with a single MCU.

Yet another objective of the present invention is to provide a modular PIM analyzer and a method using the same capable of controlling the output in a way that the loss of the test frequency signal is compensated.

In order to achieve the above mentioned objectives, a modular PIM analyzer according to an exemplary embodiment of the present invention comprises: a first signal amplification module provided with a first signal generator for generating a first frequency signal under the control of a first micro control unit (herein after referred to as 'MCU'), and a first power amplifier for generating a first amplified frequency signal through the amplification of the first frequency signal under the control of a first automatic level control (ALC) circuit; a second signal amplification module provided with a second signal generator for generating a second frequency signal under the control of a second MCU, and a second power amplifier for generating a second amplified frequency signal through the amplification of the second frequency signal under the control of a second automatic level control (hereinafter referred to as 'ALC') circuit; and a triplexer module for extracting a test frequency signal using the first amplified frequency signal and the second amplified frequency signal, transmitting the test frequency signal to a device under test, and receiving a PIM signal being reflected from the device under test.

The first signal amplifier module, the second signal amplifier module, or the triplexer module can be detached for replacement according to a frequency band of the device under test.

The triplexer module may further include a directional coupler for coupling the test frequency signal, and a divider for separating the coupled signal from the divider for generating a coupling frequency signal; and wherein the coupling frequency signal may be transmitted to the first signal amplification module or the second signal amplifier module.

The first signal amplification module may further include a directional coupler for generating a coupling frequency signal through coupling of the first amplified frequency signal; and wherein the coupling frequency signal may be transmitted to the first MCU.

The first signal amplification module may further include a mixer electrically connected to the first MCU, and wherein the mixer may convert the frequency of a received coupling frequency signal based on a predetermined frequency, and may transmit the converted coupling frequency signal to the first MCU.

The converted coupling frequency signal can be obtained as a signal having a frequency whose frequency is subtracted from the frequency of the received coupling frequency signal by the predetermined frequency value.

The first MCU controls the first signal generator based on a coupling frequency signal and an estimated frequency signal estimated from the value of the coupling frequency signal; and wherein the coupling frequency signal may be one of a signal coupled from the first amplified frequency signal or a signal coupled and divided from the test frequency signal.

The first MCU controls the first signal generator in a way that when there is a difference between a coupling frequency signal and an estimated frequency signal estimated from the value of the coupling frequency signal, a signal for canceling the difference is generated; and wherein the coupling frequency signal may be one of a signal coupled from the first amplified frequency signal or a signal coupled and divided from the test frequency signal.

An analysis module may further be comprised for generating information related to PIM based on the PIM signal.

The analysis module may transmit the information related to PIM to the external devices.

In addition, a method for analyzing PIM using a modular PIM analyzer according to an exemplary embodiment of the present invention includes the steps of: generating a first amplified frequency signal wherein a first signal amplification module generates a first frequency signal under the control of a first MCU, and the first frequency signal is amplified under the control of a first ALC circuit; generating a second amplified frequency signal wherein a second signal amplification module generates a second frequency signal under the control of a second MCU, and the second frequency signal is amplified under the control of a second ALC circuit; transmitting a test frequency signal wherein a triplexer module extracts a test frequency signal using the first amplified frequency signal and the second amplified frequency signal, and transmits the test frequency signal to a device under test; receiving a PIM signal wherein the triplexer module receives the PIM signal reflected from the device under test depending on the transmission of the test frequency signal; and generating information related to PIM wherein an analysis module generates the information related to PIM based on the PIM signal.

A modular PIM analyzer and method using the same according to an exemplary embodiment of the present invention is detachable for replacement according to the frequency bands of the device under test, and as the PIM analyzer can be applied to various frequency bands, there is an effect that the volume and the weight are not increased.

Also, the modular PIM analyzer and method using the same according to an exemplary embodiment of the present invention controls the signal generator and the power amplifier with a single MCU therefore the MCU in the power amplifier can be removed, and thus, there is an effect that the structure becomes simplified.

In addition, the modular PIM analyzer and method using the same according to an exemplary embodiment of the present invention controls the output in a way that the loss of the test frequency signal is compensated, so there is an effect that when a loss occurs in the test frequency signal depending on the frequency or the temperature, this can be compensated.

BRIEF DESCRIPTION OF DRAWINGS

In order to more sufficiently understand the drawings being quoted in the detailed description of the present invention, a detailed description of each drawing is provided.

DETAILED DESCRIPTION OF EMBODIMENT

Figure 1:
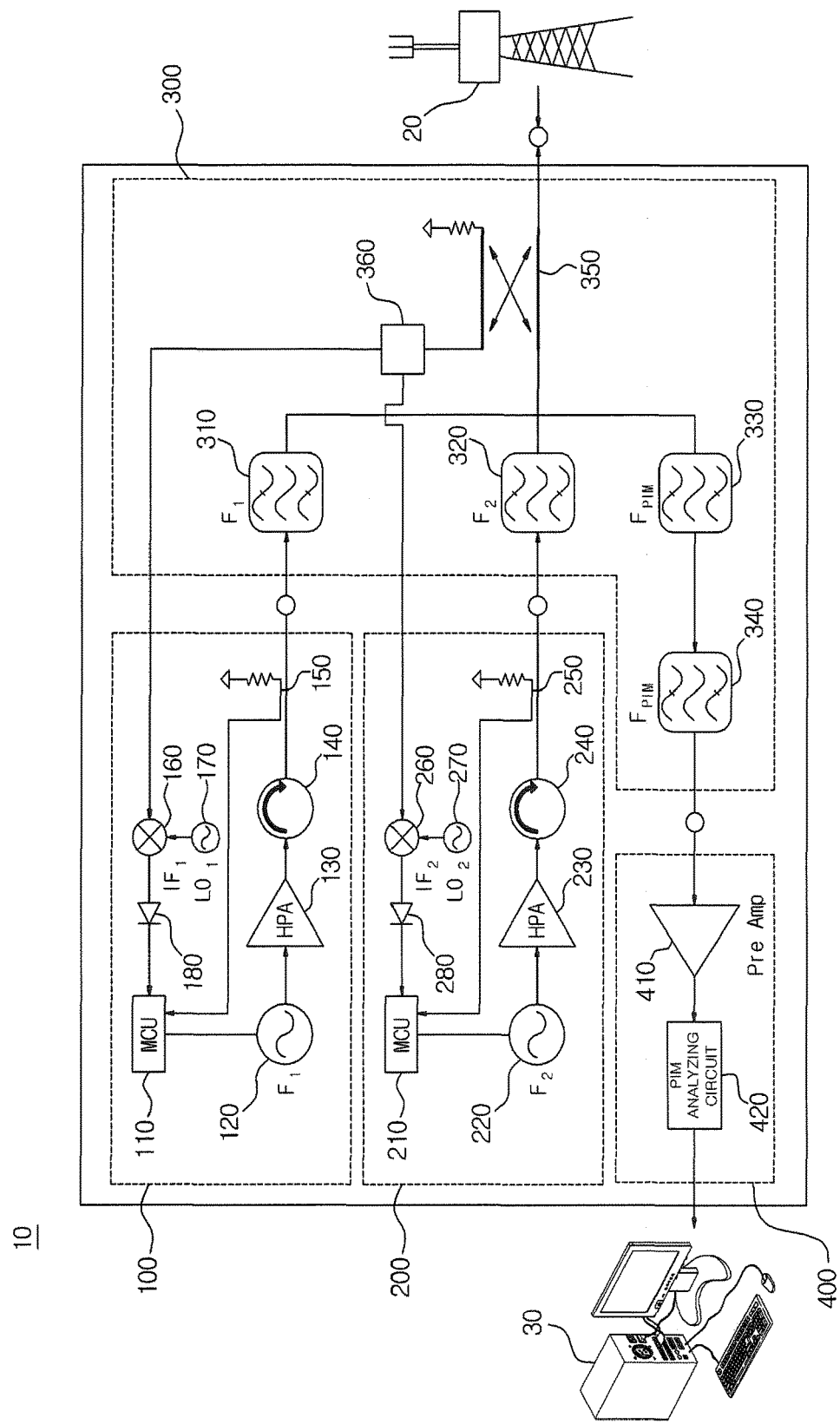
FIG. 1 is a block diagram describing a modular PIM analyzer according to an exemplary embodiment of the present invention.

As specific structural or functional descriptions for the embodiments according to the concept of the invention disclosed herein are merely exemplified for purposes of describing the embodiments according to the concept of the invention, the embodiments according to the concept of the invention may be embodied in various forms but are not limited to the embodiments described herein.

While the embodiments of the present invention are susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram describing a modular PIM analyzer according to an exemplary embodiment of the present invention. Hereinafter the modular PIM analyzer 10 will be described in detail with reference to FIG. 1.

The modular PIM analyzer 10 may comprise a first signal amplification module 100, a second signal amplification module 200, and a triplexer module 300. Also, the modular PIM analyzer 10 may further comprise an analysis module 400.

The first signal amplification module 100, the second signal amplification module 200, or the triplexer module 300 can be configured to be detachable for replacement according to the frequency band of a device under test 20.

The first signal amplification module 100 may comprise a first MCU 110, a first signal generator 120, and a first power amplifier 130. Also, the first signal amplification module 100 may further comprise a first isolator 140.

The second signal amplification module 200 may comprise a second MCU 210, a second signal generator 220, and a second power amplifier 230. Also, the second signal amplification module 200 may further comprise a second isolator 240.

The first signal amplification module 100 and the second signal amplification module 200 may be configured to be physically identical.

Therefore, it should be understood that the modular PIM analyzer 10 according to an exemplary embodiment of the present invention intentionally distinguish the first signal amplification module 100 from a second signal amplification module 200 in order to distinguish the frequency signals generated from the two signal amplifier modules. That is, hereinafter, the descriptions of the first signal amplification module 100 and the sub-elements of the first signal amplification module 100 may be applied to the second signal amplification module 200 and the sub-elements of the second signal amplification module 200 even if not mentioned separately.

'MCU' of the first MCU 110 stands for 'micro control unit,' and the first MCU 110 can control the generation and maintaining of a first frequency signal. That is, the first MCU 110 can control a first signal generator 120 generating the first frequency signal.

'Signal generator' of the first signal generator 120 is also referred to as 'SG,' and the first signal generator 120 can generate the first frequency signal.

'Power amplifier' of the first power amplifier 130 is also referred to as 'High Power Amplifier (HPA),' and the first power amplifier 130 can generate a first amplified frequency signal through amplification of the first frequency signal. A first automatic level control circuit may be implemented in order to generate and maintain the first amplified frequency signal.

'Automatic level control' of the first automatic level control circuit is also referred to as 'Auto Level Control (ALC),' and it is a control circuit for maintaining the value of the output signal at a constant value. That is, the first automatic level control circuit can perform a control function for generating and maintaining the first amplified frequency signal at a constant level.

In the present invention, due to the first automatic level control circuit, the first frequency signal and the first amplified frequency signal can be controlled with only a single MCU.

The first amplified frequency signal outputted from the first power amplifier 130 can be passed through the first isolator 140 and transmitted to the triplexer module 300. The first isolator 140 can block the inflow of the signal reflected from the triplexer module 300 towards the output end of the first power amplifier 130.

Also in the case of the second signal amplification module 200, the second signal generator 220 can generate a second frequency signal under the control of the second MCU 210, and the second power amplifier 230 can generate a second amplified frequency signal through amplification of the second frequency signal under the control of the second automatic level control circuit.

The triplexer module 300 may comprise a first filter 310, a second filter 320, a first PIM filter 330, and a second PIM filter 340.

The triplexer module 300 may extract a test frequency signal using the first amplified frequency signal and the second amplified frequency signal.

The unnecessary portion of the first amplified frequency signal except the necessary signal for the measurement of PIM of the device under test 20 can be removed through the first filter 310. Also, the unnecessary portion of the second amplified frequency signal except the necessary signal for the measurement of PIM of the device under test 20 can be removed through the second filter 320. For example, the unnecessary portion may be the noise and the like of the unintended frequency band.

The test frequency signals can be extracted after filtering the first amplified frequency signal and the second amplifier frequency signal through the first filter 310 and the second filter 320 respectively.

The triplexer module 300 may transmit the test frequency signal to the device under test 20. When the test frequency signal is transmitted to the device under test 20, a PIM signal may be reflected from the device under test 20 thereby.

The triplexer module 300 may receive the PIM signal. After receiving the PIM signal, the triplexer module 300 may transmit the PIM signal to the analysis module 400 through the processes as follows.

The first PIM filter 330 may perform filtering to remove the unnecessary signals from the PIM signal reflected from the device under test 20 for PIM analysis. Among the PIM signal that has been passed through the first PIM filter 330, only a specific frequency band signal corresponding to the PIM component can be selectively passed through the second PIM filter 340. For example, a ceramic filter may be applied as for the second PIM filter 340. The PIM signal that has been passed through the second PIM filter 340 can be transmitted to the analysis module 400.

The analysis module 400 may comprise a PIM signal pre-amplifier 410 and a PIM analyzing part 420.

The PIM signal pre-amplifier 410 can amplify the PIM signal received from the triplexer module 300. After amplifying the PIM signal, the PIM analyzing part 420 can generate information related to PIM based on the PIM signal. In the present invention, the information related to PIM means PIM related information generated from the device under test 20. For example, information related to PIM may be only the PIM measurement values, but may further include information on the location where the PIM is occurring or the time of measurement, the device under test 20, and the like.

The analysis module 400 can transmit the information related to PIM to an external device 30. In the present invention, the external device 30 may mean devices such as PCs, laptops, tablet PCs, mobile terminals, and the like which are capable of receiving the information related to PIM, and verifying, storing, and processing thereof.

As described above, the process for PIM analysis of the device under test 20 through a modular PIM analyzer 10 according to an exemplary embodiment of the present invention has been described.

In the description hereinbelow, a configuration wherein a modular PIM analyzer 10 according to an exemplary embodiment of the present invention is included for more precise measurement and analysis will be described.

The first signal amplification module 100 may further comprise a first directional coupler 150, a first mixer 160, a first local oscillator 170, and a first detector 180. Similarly, the second signal amplification module 200 may further comprise a second directional coupler 250, a second mixer 260, a second local oscillator 270, and a second detector 280.

The triplexer module 300 may further comprise a directional coupler 350 and a divider 360.

The first directional coupler 150 of the first signal amplification module 100 can generate a coupling frequency signal by coupling the first amplified frequency signal. The coupling frequency signal can be transmitted to the first MCU 110.

The directional coupler 350 of the triplexer module 300 can couple the test frequency signal. The divider 360 can separate the coupled signal from the directional coupler 350. That is, the divider 360 can separate the coupled signals into the signals corresponding to each frequency thereof. The coupling frequency signal generated through the directional coupler 350 and the divider 360 can be transmitted to the first signal amplification module 100 or the second signal amplification module 200 according to the divided frequency values. For example, it can be transmitted to the first MCU 110.

The first MCU 110 can receive the coupling frequency signal through the above described process. That is, the coupling frequency signal may be the one of the signal coupled from the first amplified frequency signal or the signal coupled and divided from the test frequency signal.

However, before the first MCU 110 receives the coupling frequency signal, processes of frequency conversion and signal detection of the coupling frequency signal may further be included as described hereinbelow. Such process is a process for converting into a frequency band signal that can be handled by the MCU.

The first mixer 160 and the first local oscillator 170 may be used for the frequency conversion.

The first mixer 160 may be a mixer electrically connected to the first MCU 110.

The first mixer 160 can convert the frequency of received coupling frequency signal based on the predetermined frequency value. The predetermined frequency value may be the frequency value generated by the first local oscillator 170.

For example, the coupling frequency signal being converted through the first mixer 160 may be obtained as a signal having a frequency that is subtracted from the frequency value of the original coupling frequency signal by a predetermined frequency value generated in the local oscillator 170. That is, a converted coupling frequency signal having a lower frequency can be obtained by down-converting the original coupling frequency signal using the first mixer 160. Through this process, the converted coupling frequency signal can have a frequency range that can be handled by the first MCU.

The converted coupling frequency signal may be inputted to the first MCU 110 through the first detector 180. The first detector 180 has a function of detecting the converted coupling frequency signal, and may be implemented with an element such as a diode.

The first MCU 110 may control the first signal generator 120 based on the received actual coupling frequency signal and 'the predicted frequency signal predicted to be the value of the coupling frequency signal.'

In the present invention, 'the predicted frequency signal predicted to be the value of the coupling frequency signal' is the predicted value calculated by internal operation and the like of the first MCU 110 or the predicted value stored in advance, and may refer to a signal anticipated and intended to be the original output frequency signal tuned to the coupling frequency signal. For example, it may refer to a first amplified frequency signal or a test frequency signal that were predicted by the first MCU 110.

The control of the first MCU 110 may be performed as follows. For example, the first MCU 110 can verify whether there is a difference between the received actual coupling frequency signal and the predicted frequency signal. If there is a difference, the first MCU 110 may provide feedback to the first signal generator 120 to generate a signal to compensate for this difference.

For example, when giving feedback from the first MCU 110 to the first signal generator 120, a corresponding voltage value selected according to a table value previously inputted to the first MCU 110 may be inputted to a voltage variable attenuator (VVA) chip included in the circuit configuration of the first signal generator 120. The VVA chip can change the attenuation value according to the inputted voltage value and apply the changed value to the first signal generator 120. As the interval of the signal levels of the table values pre-inputted to the first MCU 110 becomes closer, consequentially, the variation range of the first amplified frequency signal or the test frequency signal may be reduced. That is, the first amplified frequency signal or the test frequency signal being outputted can be adjusted elaborately.

The feedback function of the first MCU 110 can appropriately adjust the first frequency signal generated by the first signal generator 120, and as a result, the first amplified frequency signal or the test frequency signal corresponding to the intended value of the signal can be outputted.

The PIM analysis device 10 according to an exemplary embodiment of the present invention can repeatedly perform such feedback and adjustment processes.

Therefore, by changing the first signal amplification module 100, the second signal amplification module 200, or the triplexer module 300 in order to change the frequency band to be measured of the device under test 20, it becomes possible to compensate for the loss due to frequency variation or temperature change. And thus, it is possible to solve the problem that the accuracy of the PIM measurement or analysis result of the PIM analyzer 10 is degraded due to the changing process of the modules.

Figure 2:
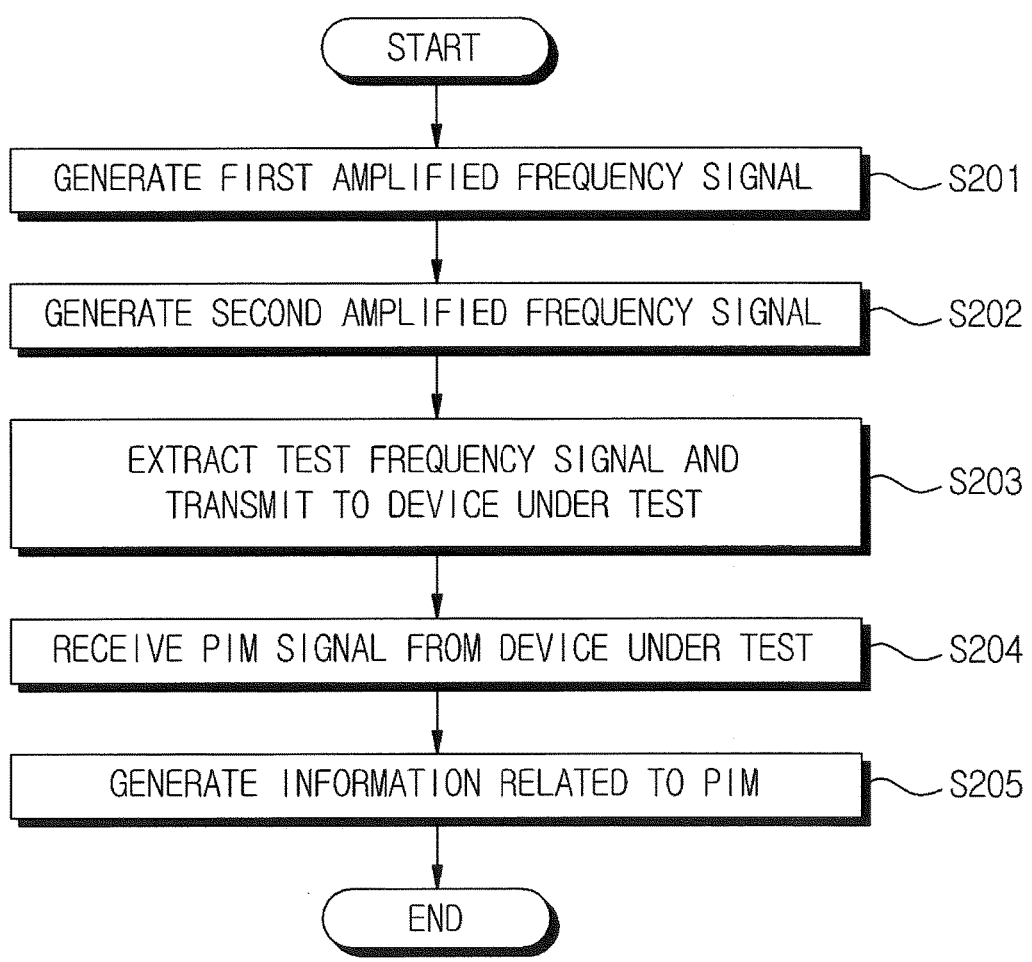
FIG. 2 is a flow diagram describing the PIM analysis method according to an exemplary embodiment of the present invention.

FIG. 2 is a flow diagram describing the PIM analysis method according to an exemplary embodiment of the present invention. Hereinafter, a PIM analysis method according to an embodiment of the present invention will be described with reference to FIG. 2.

The PIM analysis method according to an embodiment of the present invention can be performed by the above-described modular PIM analyzer 10. Therefore, the principle of the PIM analyzer 10 described above can be equally applied to the PIM analysis method.

First, the first signal amplification module 100 generates a first amplified frequency signal (S201). The first signal amplification module 100 generates the first frequency signal under the control of the first MCU 110 and amplifies the first frequency signal under the control of the first automatic level control circuit so that the first amplified frequency signal can be generated.

Next, the second signal amplification module 200 generates a second amplified frequency signal (S202). The second signal amplification module 200 generates the second frequency signal under the control of the second MCU 210 and amplifies the second frequency signal under the control of the second automatic level control circuit so that the second amplified frequency signal can be generated.

Next, the triplexer module 300 extracts the test frequency signal and transmits it to the device under test 20 (S203). The triplexer module 300 can extract the test frequency signal using the first amplified frequency signal and the second amplified frequency signal and transmit the test frequency signal to the device under test 20.

Next, the triplexer module 300 receives the PIM signal from the device under test 20 (S204). It is possible to receive the PIM signal reflected from the device under test 20 according to the transmission of the test frequency signal.

Next, the analysis module 400 generates information related to PIM based on the PIM signal (S205).

Figure 3:
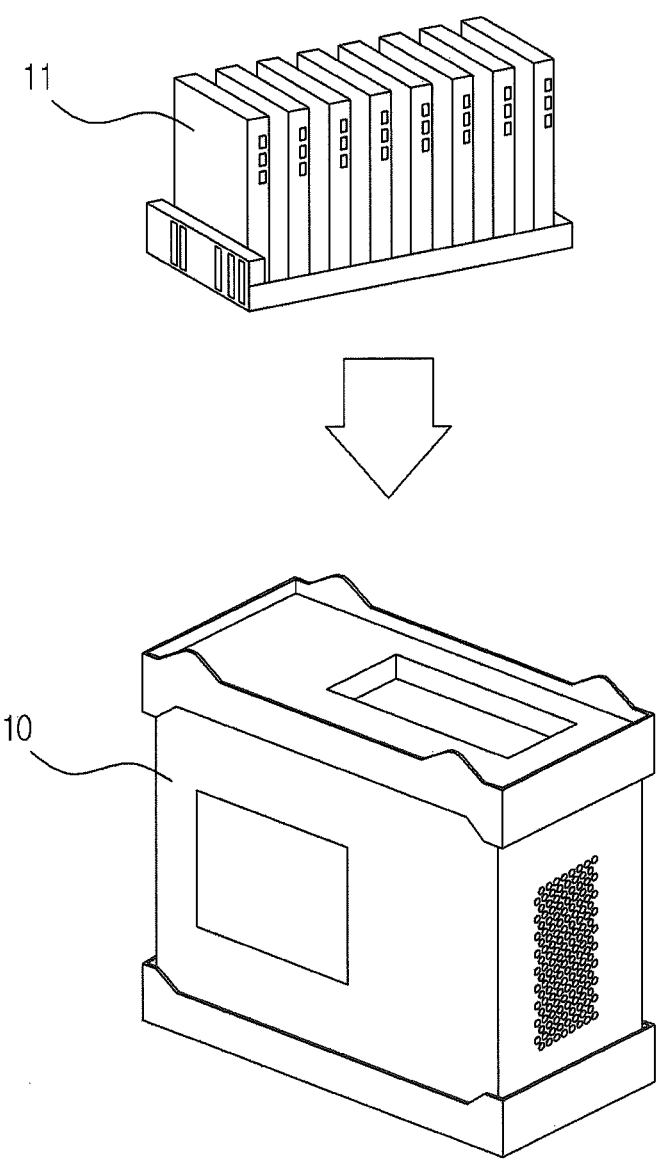
FIG. 3 is a perspective view illustrating an example of a manufactured modular PIM analyzer according to an exemplary embodiment of the present invention.

FIG. 3 is a perspective view illustrating an example of a manufactured modular PIM analyzer according to an exemplary embodiment of the present invention.

A detachable module 11 may be mounted on the modular PIM analyzer 10. It is possible to select the detachable module 11 corresponding to the frequency band according to the used frequency band of the measured device 20 and mount the detachable module 11 on the modular PIM analyzer 10.

In the present invention, the detachable module 11 may be the first signal amplification module 100, the second signal amplification module 200, or the triplexer module 300 as described above. Alternatively, the detachable module 11 may be manufactured by a combination of these modules.

Each of the drawings referred to in the description of the foregoing embodiments is merely one embodiment for the sake of convenience of explanation, and items, contents and images of information displayed on each screen can be modified and displayed in various forms.

While the present invention has been particularly shown and described with reference to exemplary embodiments thereof, it is evident that many alternatives, modifications and variations will be apparent to those skilled in the art. Accordingly, the true scope of protection of the present invention should be determined by the technical spirit of the appended claims.

DESCRIPTION OF SYMBOLS

10: modular PIM analyzer
11: detachable module
20: device under test
30: external device
100: first signal amplification module
110: first MCU
120: first signal generator
130: first power amplifier
140: first isolator
150: first directional coupler
160: first mixer
170: first local oscillator
180: first detector
200: second signal amplification module
210: second MCU
220: second signal generator
230: second power amplifier
240: second isolator
250: second directional coupler
260: second mixer
270: second local oscillator
280: second detector
300: triplexer module
310: first filter
320: second filter
330: first PIM filter
340: second PIM filter
350: directional coupler
360: divider
400: analysis module
410: PIM signal pre-amplifier
420: PIM analysis part

What is claimed is:

1. A modular PIM (passive inter-modulation) analyzer comprising:
a first signal amplification module provided with a first signal generator for generating a first frequency signal under the control of a first MCU (micro control unit), and a first power amplifier for generating a first amplified frequency signal through the amplification of the first frequency signal under the control of a first ALC (automatic level control) circuit;
a second signal amplification module provided with a second signal generator for generating a second frequency signal under the control of a second MCU, and a second power amplifier for generating a second amplified frequency signal through the amplification of the second frequency signal under the control of a second ALC circuit; and
a triplexer module for extracting a test frequency signal using the first amplified frequency signal and the second amplified frequency signal, transmitting the test frequency signal to a device under test, and receiving a PIM signal being reflected from the device under test,
wherein the first signal amplification module further includes a mixer electrically connected to the first MCU, and
wherein the mixer converts a frequency of a received coupling frequency signal based on a predetermined frequency, and transmits the converted coupling frequency signal to the first MCU.

2. A modular PIM analyzer according to claim 1, wherein the first signal amplifier module, the second signal amplifier module, or the triplexer module is detachable for replacement according to a frequency band of the device under test.

3. A modular PIM analyzer according to claim 1, wherein the triplexer module further includes a directional coupler for coupling the test frequency signal and a divider for separating the coupled signal from the divider for generating a coupling frequency signal; and
wherein the coupling frequency signal is transmitted to the first signal amplification module or the second signal amplifier module.

4. A modular PIM analyzer according to claim 1, wherein the first signal amplification module further includes a directional coupler for generating a coupling frequency signal through coupling of the first amplified frequency signal; and
wherein the coupling frequency signal is transmitted to the first MCU.

5. A modular PIM analyzer according to claim 1, wherein the converted coupling frequency signal is obtained as a signal having a frequency whose frequency is subtracted from the frequency of the received coupling frequency signal by the predetermined frequency value.

6. A modular PIM analyzer according to claim 1, wherein the first MCU controls the first signal generator based on a coupling frequency signal and an estimated frequency signal estimated from the value of the coupling frequency signal; and
wherein the coupling frequency signal is one of a signal coupled from the first amplified frequency signal or a signal coupled and divided from the test frequency signal.

7. A modular PIM analyzer according to claim 1, wherein the first MCU controls the first signal generator in a way that when there is a difference between a coupling frequency signal and an estimated frequency signal estimated from the value of the coupling frequency signal, a signal for canceling the difference is generated; and
wherein the coupling frequency signal is one of a signal coupled from the first amplified frequency signal or a signal coupled and divided from the test frequency signal.

8. A modular PIM analyzer according to claim 1, further comprising:
an analysis module generating information related to PIM based on the PIM signal.

9. A modular PIM analyzer according to claim 8, wherein the analysis module transmits the information related to PIM to the external devices.

10. A method for analyzing PIM (passive inter-modulation) using a modular PIM analyzer including the steps of:
generating a first amplified frequency signal wherein a first signal amplification module generates a first frequency signal under the control of a first MCU, and the first frequency signal is amplified under the control of a first ALC circuit;
generating a second amplified frequency signal wherein a second signal amplification module generates a second frequency signal under the control of a second MCU, and the second frequency signal is amplified under the control of a second ALC circuit;
transmitting a test frequency signal wherein a triplexer module extracts a test frequency signal using the first amplified frequency signal and the second amplified frequency signal, and transmits the test frequency signal to a device under test;
receiving a PIM signal wherein the triplexer module receives the PIM signal reflected from the device under test depending on the transmission of the test frequency signal; and
generating information related to PIM wherein an analysis module generates the information related to PIM based on the PIM signal,
wherein the first signal amplification module further includes a mixer electrically connected to the first MCU, and
wherein the mixer converts a frequency of a received coupling frequency signal based on a predetermined frequency, and transmits the converted coupling frequency signal to the first MCU.

* * * * *